(12) United States Patent
Hwang et al.

(10) Patent No.: US 8,800,271 B2
(45) Date of Patent: Aug. 12, 2014

(54) SELECTIVE CATALYST REDUCTION SYSTEM WITH BYPASS SYSTEM

(75) Inventors: Keai Yoon Hwang, Busan (KR); Sung Chul Hwang, Busan (KR)

(73) Assignee: Kwang Sung Co., Ltd., Gimhae-si (KR)

( * ) Notice: Subject to any disclaimer, the term of this patent is extended or adjusted under 35 U.S.C. 154(b) by 365 days.

(21) Appl. No.: 12/866,092

(22) PCT Filed: Oct. 16, 2009

(86) PCT No.: PCT/KR2009/005978
§ 371 (c)(1),
(2), (4) Date: Sep. 7, 2010

(87) PCT Pub. No.: WO2011/034240
PCT Pub. Date: Mar. 24, 2011

(65) Prior Publication Data
US 2011/0258991 A1 Oct. 27, 2011

(30) Foreign Application Priority Data

Sep. 18, 2009 (KR) .......................... 10-2009-0088727
Oct. 16, 2009 (KR) .......................... 10-2009-0098681

(51) Int. Cl.
*F01N 3/00* (2006.01)
*F01N 3/10* (2006.01)
*F01N 1/00* (2006.01)

(52) U.S. Cl.
USPC ................. 60/295; 60/287; 60/288; 60/292; 60/296; 60/324; 60/307

(58) Field of Classification Search
USPC .......... 60/285, 297, 295, 303, 324, 288, 292, 60/307, 296
See application file for complete search history.

(56) References Cited

U.S. PATENT DOCUMENTS

| 5,406,790 A | * | 4/1995 | Hirota et al. | 60/276 |
| 6,192,677 B1 | * | 2/2001 | Tost | 60/286 |
| 2007/0137184 A1 | * | 6/2007 | Patchett et al. | 60/286 |
| 2009/0064669 A1 | * | 3/2009 | Mabuchi et al. | 60/310 |
| 2009/0199537 A1 | * | 8/2009 | Sisken et al. | 60/273 |
| 2010/0236224 A1 | * | 9/2010 | Kumar et al. | 60/297 |

FOREIGN PATENT DOCUMENTS

| JP | 2001-140635 | 5/2001 |
| JP | 2006-009608 | 1/2006 |
| JP | 2009-041371 | 2/2009 |

OTHER PUBLICATIONS

International Search Report and Written Opinion from PCT/KR2009/005978 dated Sep. 28, 2010.

* cited by examiner

*Primary Examiner* — Kenneth Bomberg
*Assistant Examiner* — Jason Sheppard
(74) *Attorney, Agent, or Firm* — Calfee, Halter & Griswold LLP (57) ABSTRACT

Disclosed herein is an SCR system of a vessel for discharging exhaust gas from an exhaust gas source in the vessel to an outside after performing purification of the exhaust gas. The SCR system includes an SCR reactor connected at a leading end thereof to the exhaust gas source and including a catalyst activated by the exhaust gas introduced into the SCR reactor, a reducing agent supply line supplying $NH_3$ or urea into the SCR reactor, and a bypass system forcing the exhaust gas discharged from the exhaust gas source to bypass the SCR reactor.

3 Claims, 6 Drawing Sheets

SELECTIVE CATALYST REDUCTION SYSTEM WITH BYPASS SYSTEM

CROSS-REFERENCE TO RELATED APPLICATION

This application claims the benefit under 35 U.S.A. §119 of Korean Patent Application No. 10-2009-0088727,filed on Sep. 18, 2009 in the Korean Intellectual Property Office, the entirety of which is incorporated herein by reference.

BACKGROUND

1. Technical Field

The present disclosure relates to a selective catalyst reduction (SCR) system that reduces nitrogen oxides (NOx) in exhaust gas and, more particularly, to an SCR system that purifies exhaust gas discharged from a vessel. The present invention is applicable to any kind of vessel and has been developed to satisfy a variety of regulations.

2. Description of the Related Art

An SCR system is used to reduce nitrogen oxides (NOx) in exhaust gas generated during operation of a vessel. For example, the SCR is provided for the purpose of reducing nitrogen oxides discharged from a vessel engine or a boiler in an LNG carrier. The SCR system is based on a selective catalyst reduction method and is configured to reduce NOx into nitrogen and vapor through reaction with a reducing agent while forcing the reducing agent and exhaust gas to pass through catalysts at the same time. In recent years, various attempts have been made to improve the SCR system for vessels, but it is still difficult to achieve satisfactory results due to unique conditions under which such vessels operate, for example, movement and vibration at sea and large loads resulting therefrom.

Conventionally, the SCR system employs $NH_3$ and urea as reducing agents for reducing NOx. Further, the SCR system employs a high temperature catalyst that is activated at 330~400° C. Thus, the conventional SCR system includes a reheating system for heating exhaust gas at a leading end of a casing of an SCR reactor, which receives a catalyst therein, in order to increase reaction efficiency corresponding to the activation temperature of the catalyst. Further, in the conventional SCR system, a dust collector is provide to a rear end of the casing of the SCR reactor to reduce the amounts of particle materials, particulates, fine dust, and the like in the exhaust gas, which has finished reaction in the SCR reactor.

The reheating system and/or the dust collector cause an increase in the overall size of the SCR system. Hence, the provision of the conventional SCR system to a relatively narrow vessel is very disadvantageous since it results in a further reduction in available space in the vessel. Further, it is necessary for the SCR system to be designed in consideration of conditions of a vessel to which the SCR system will be provided, but the provision of the reheating system and/or the dust collector can make it difficult to obtain an overall design of the SCR system, which must be made in consideration of the conditions of the vessel. In addition, the reheating system and/or the dust collector cause a significant increase in installation cost for the SCR system and require management costs therefor.

Further, since it is necessary for the conventional SCR system to use high-pressure air when supplying a reducing agent such as urea or $NH_3$ into the SCR reactor, the conventional SCR system requires complex piping or installation to guide the high-pressure air to a line supplying the reducing agent and to use a compressor. Moreover, the conventional SCR system has a limit in supplying the urea or $NH_3$ at a high purity into the SCR reactor.

In particular, since the conventional SCR system for vessels cannot stop operation of an exhaust gas source, for instance, a boiler or an engine, upon an abnormal or emergency state, it is impossible or difficult to repair or replace an abnormal part, a broken part or an inoperative part without stopping the operation of the exhaust gas source.

BRIEF SUMMARY

The present invention provides an SCR system for vessels, which includes a bypass system allowing exhaust gas to bypass an SCR reactor in order to allow a broken or inoperative part or component to be repaired or replaced without stopping operation of an exhaust gas source upon an abnormal or emergency state of the SCR system.

In accordance with one aspect, there is provided an SCR system of a vessel for discharging exhaust gas from an exhaust gas source in the vessel to the outside after performing purification of the exhaust gas. The SCR system includes: an SCR reactor connected at a leading end thereof to the exhaust gas source and including a catalyst activated by the exhaust gas introduced into the SCR reactor; a reducing agent supply line supplying $NH_3$ or urea into the SCR reactor; and a bypass system forcing the exhaust gas discharged from the exhaust gas source to bypass the SCR reactor.

The bypass system may include a bypass line connected at both ends thereof to the leading and rear ends of the SCR reactor; and bypass dampers respectively provided to both ends of the bypass line to close the bypass line in a normal state while opening the bypass line in an abnormal state.

The SCR reactor may be provided at the leading end thereof with a mixer for evenly mixing the $NH_3$ or urea and the exhaust gas and with a damper for uniformly distributing the exhaust gas in the catalyst.

The SCR reactor may be provided with an air soot blower that blows air supplied from the air line towards the catalyst to remove foreign matter from the catalyst.

DETAILED DESCRIPTION

Exemplary embodiments of the present disclosure will be described in detail with reference to the accompanying drawings. The following embodiments are given by way of illustration to provide a thorough understanding of the present invention to those skilled in the art. Hence, it should be understood that the present invention is not limited to these embodiments and may be take different forms without departing from the scope of the present invention. Likewise, it should be noted that the drawings are not to precise scale and some of the dimensions, such as width, length, thickness, and the like, are exaggerated for clarity of description in the drawings. Like elements are denoted by like reference numerals throughout the specification and drawings. Further, terms of elements or signals represented in the drawings are listed in the following Table 1.

TABLE 1

| Signal | Name |
|---|---|
| ⋈ | Cock valve |
| ⋈ | Ball valve |
| ⋈ | Solenoid valve |
| ╱╲╱╲⊙╱╲╱╲ | Pressure adjuster |
| | Y-shaped filter |
| | Pump |
| | Flow meter |
| | Manometer |
| | Check valve |
| | NOx sensor |
| | Pressure sensor |
| | Temperature sensor |
| | $NH_3$ sensor |
| → | Input signal |
| ----▶ | Output signal |

First Embodiment

Figure 1:
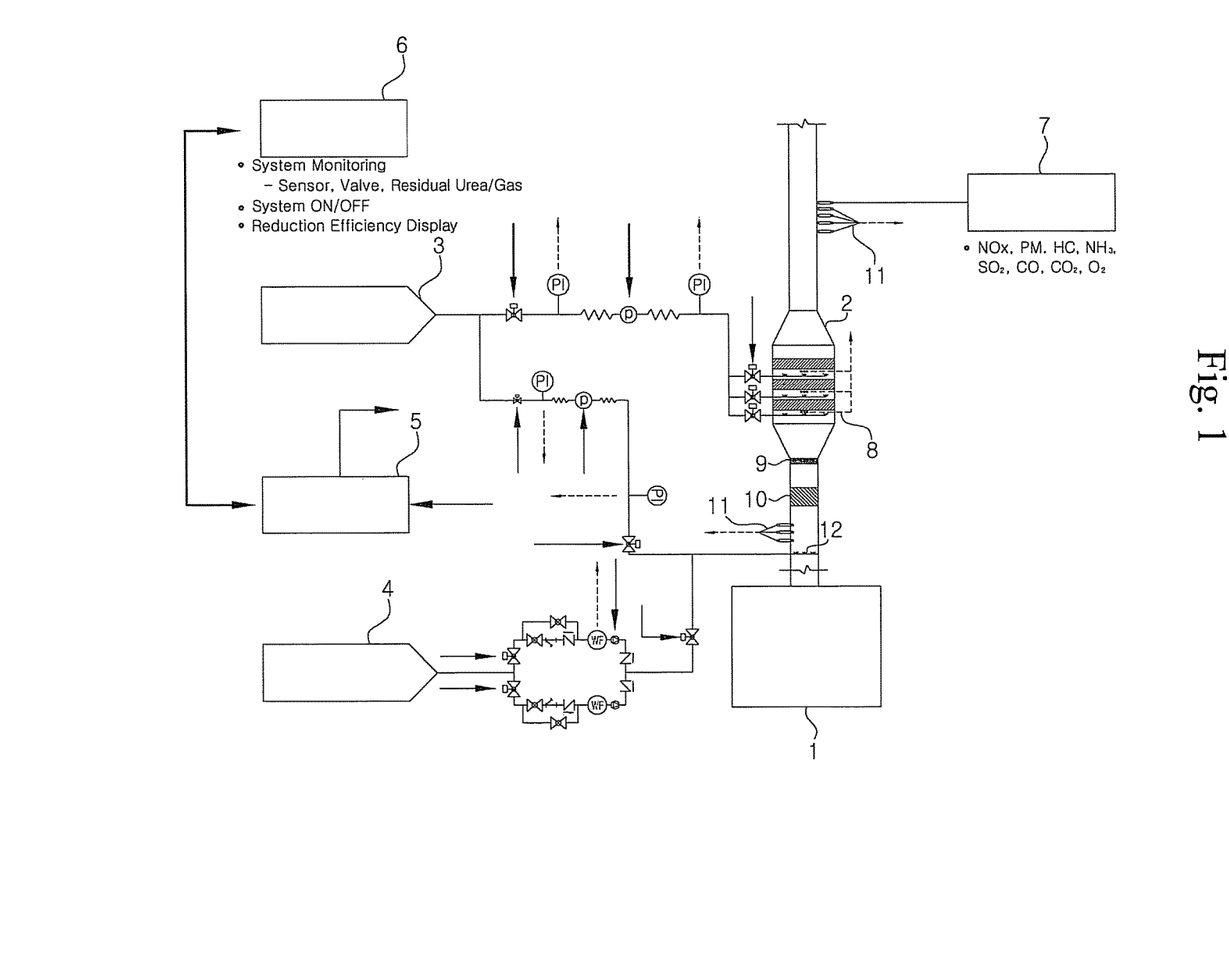
FIG. 1 is a view of an SCR system for vessels in accordance with a first embodiment of the present disclosure.

FIG. 1 is a view of an SCR system for vessels in accordance with a first embodiment. Herein, the term "vessel" refers not only to a typical ship having a propulsion engine but also to any marine floating structure.

Referring to FIG. 1, the SCR system of this embodiment includes an SCR reactor 2 connected at a leading end thereof to an exhaust gas source 1. The exhaust gas source 1 may include an engine for propulsion or other purposes in a vessel, a boiler in an LNG carrier, and other kinds of installation that discharge exhaust gas via combustion in the vessel. The SCR reactor 2 includes a catalyst which reduces NOx in the exhaust gas through selective catalyst reduction. In a casing of the SCR reactor 2, the NOx is reduced into nitrogen through reaction with the reducing agent in the presence of the catalyst.

The SCR system for vessels according to this embodiment is not provided with a reheating system for heating exhaust gas, which is generally provided to the leading end of the SCR reactor in the conventional SCR system. Rather, in the SCR system of this embodiment, the SCR reactor 2 includes the catalyst which is activated at a temperature less than 320° C., and preferably less than 300° C. A lower limit of an activation temperature of the catalyst is set near a temperature of the exhaust gas when it passes through the SCR reactor 2, while satisfying the temperature condition less than 320° C., and preferably less than 300° C. Namely, in this embodiment, the SCR system selects and uses a catalyst having an activation temperature corresponding to the temperature of the exhaust gas passing through the SCR system 2 in consideration of a temperature decrease of the exhaust gas discharged from the exhaust gas source 1.

The SCR reactor 2 may include two kinds of catalyst that have different activation temperatures. This contributes to enlargement of a temperature range in which catalyst reaction occurs in the SCR reactor 2. The SCR reactor 2 may further include an additional catalyst for reducing other components in addition to the catalyst for reducing the NOx.

In this embodiment, the SCR reactor 2 is not provided with a dust collector, which is generally provided to the rear end of the SCR reactor in the conventional system. Rather, the SCR system of this embodiment may include a vibration control structure inside the SCR reactor 2, so that particle materials, particulates or fine dust may be collected inside the SCR reactor 2 by the vibration control structure.

In the SCR system of this embodiment, the SCR reactor 2 may be provided at the rear end thereof with various sensors 11 capable of detecting NOx, $NH_3$, particle materials (PM), HC, $SO_2$, CO, $CO_2$, $O_2$, and the like in the exhaust gas. Further, the SCR reactor 2 is provided at the rear end thereof with an analyzer 7 for analyzing residual components, such as NOx, $NH_3$, PM, HC, $SO_2$, CO, $CO_2$, $O_2$, and the like, in the exhaust gas based on information from the sensors 11. The various sensors 11 and the analyzer 7 are controlled by an ECU 5. The ECU 5 electronically controls not only the sensors 11 and analyzer 7, but also other devices such as valves and pumps. Further, the SCR system of this embodiment includes an OBM system 6, which is responsible for overall system control and monitoring, system On/Off, and reduction efficiency display of contaminants, in particular, NOx.

In this embodiment, the SCR system for vessels includes an air line 3 which supplies air into an air soot blower 8 inside or near the SCR reactor 2. The air soot blower 8 removes foreign matter from the catalysts by blowing the air supplied from the air line 3 towards the catalysts in the SCR reactor 2.

In this embodiment, the SCR system includes a reducing agent supply line 4 which supplies the aforementioned reducing agent into the SCR reactor 2 to reduce NOx. The reducing agent supply line 4 supplies $NH_3$ or urea into the SCR reactor 2, in which the $NH_3$ or urea reacts with NOx in the exhaust gas in the presence of the catalyst to reduce NOx.

The air line 3 includes a line, which is branched from a line extending to the air soot blower and is connected to the reducing agent supply line 4. Such structure of the air line 3 will be referred to as a "two-way" air line. The two-way air line 3 includes one air line participating in operation of the air soot blower 8 and the other air line serving to push the $NH_3$ or urea into an injection nozzle 12 in the SCR reactor 2.

Further, the SCR system of this embodiment includes a damper 9 disposed at an inlet of the SCR reactor 2 to evenly distribute exhaust gas in the catalyst. Further, a mixer 10 is provided at the leading end of the SCR reactor upstream of the damper 9 to uniformly mix the exhaust gas with the $NH_3$/urea. The leading end of the SCR reactor 2 is also provided with the various sensors 11, which measure and analyze the amounts of NOx, $NH_3$, PM, HC, $SO_2$, CO, $CO_2$, $O_2$, and the like in the exhaust gas before purification of the exhaust gas, that is, before the exhaust gas passes through the SCR reactor 2. The analyzed information will be compared with information about components in the purified exhaust gas that has passed through the SCR reactor 2.

Second Embodiment: One-Way Air Line

Figure 2:
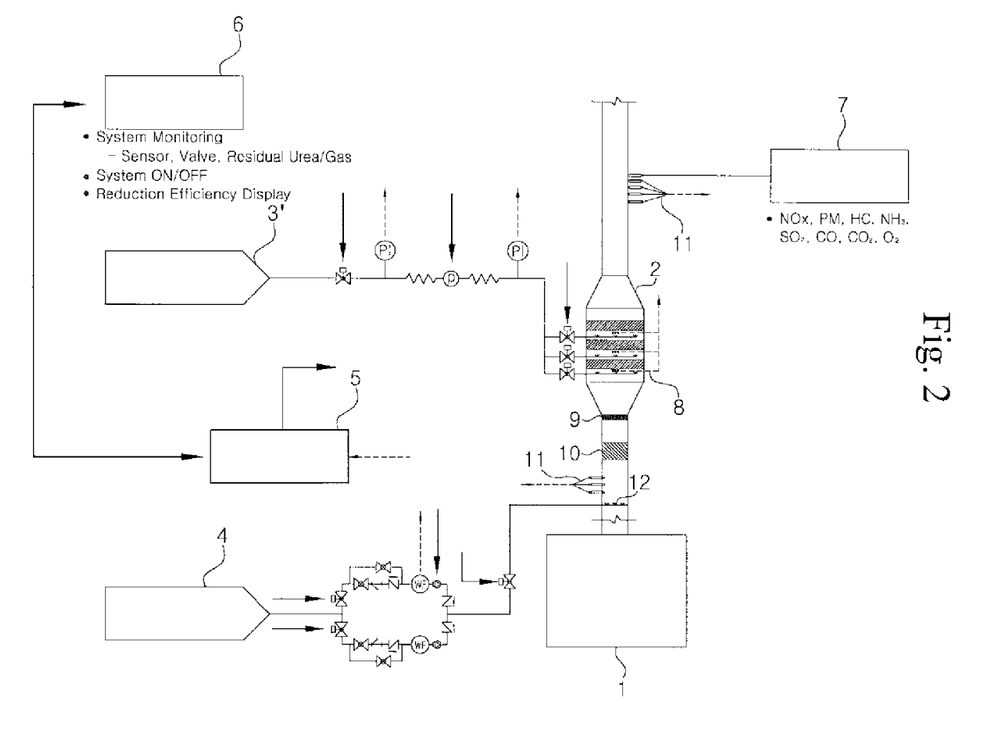
FIG. 2 is a view of an SCR system for vessels in accordance with a second embodiment of the present disclosure.

Referring to FIG. 2, the SCR system of this embodiment includes a reducing agent supply line 4 for supplying $NH_3$/urea into an SCR reactor 2. The reducing agent supply line 4 is extended to an injection nozzle 12 at the leading end of the SCR reactor 2, instead of being connected to the air line 3' as in the above embodiment. Since the reducing agent supply line 4 directly supplies the $NH_3$/urea to the injection nozzle 12 at the leading end of the SCR reactor 2 using a supply device, such as a pump or the like, incorporated into the reducing agent supply line 4 per se, it is possible to simplify a piping structure of the system and to enable reduction of NOx using a higher purity of $NH_3$ or urea. For this purpose, the SCR system may include devices for controlling the flux of $NH_3$ or urea in the pump or in a control line connected to the pump. In this structure, the air line 3' of this embodiment includes a single line which will participate in operation of the air soot blower 8, and will be referred to as a "one-way air line." Other components of this embodiment are the same as those of the first embodiment and a description thereof will be omitted herein.

Third Embodiment: Anti-Vibration Device for Earthquake-Proof/Seismic Isolation/Vibration Control FIG. 3 is a view of an SCR system for vessels in accordance with a third embodiment.

Figure 3:
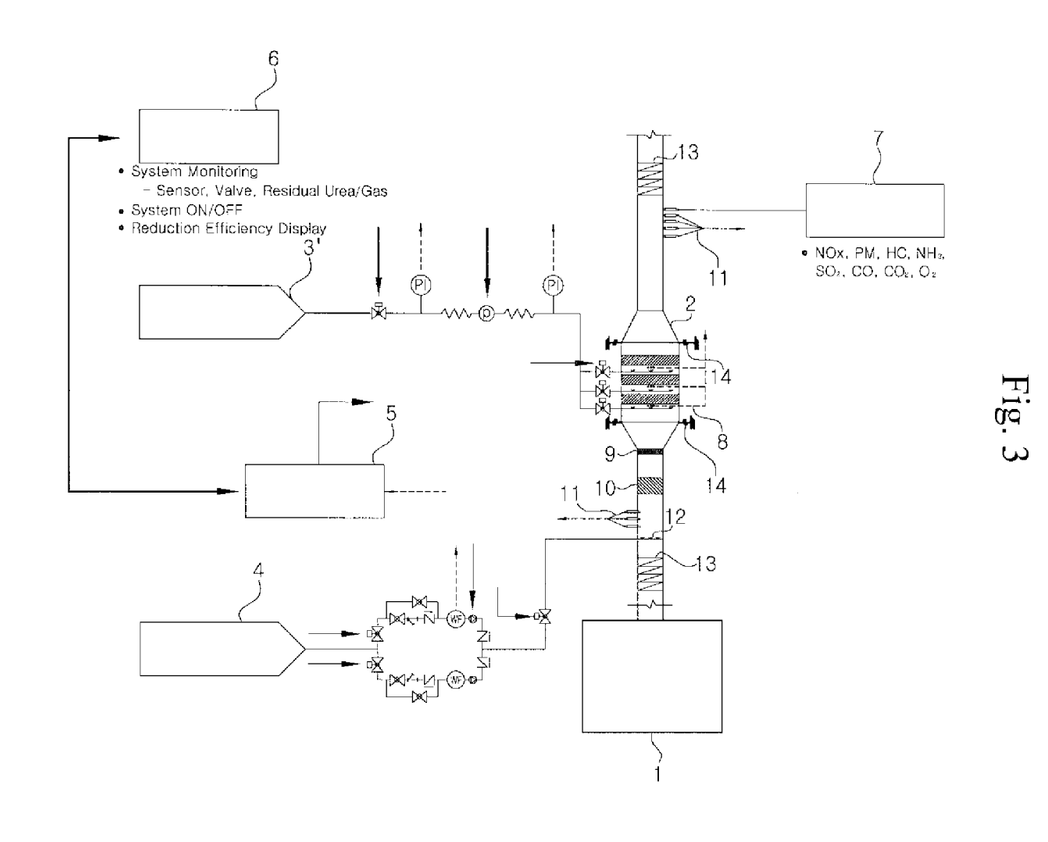
FIG. 3 is a view of an SCR system for vessels in accordance with a third embodiment of the present disclosure.

Referring to FIG. 3, the SCR system of this embodiment includes an anti-vibration vibration device for earthquake-proof/seismic isolation/vibration control in an SCR reactor 2. Since a vessel moves under its own power or is moved by waves while sea, the vessel undergoes severe vibration and large load. Accordingly, the SCR system of this embodiment includes the anti-vibration device 14 in the SCR reactor 2. Here, the anti-vibration device 14 may have a suspension structure, but is not limited thereto. Further, each pipe provided to leading and rear ends of the SCR reactor 2 has a flexible connection structure in order to ensure good operation of the anti-vibration device 14 with respect to the SCR reactor 2. In this embodiment, flexible joints 13 are used for pipe connection to the leading and rear ends of the SCR reactor 2. The SCR system shown in FIG. 3 includes the one-way air line 3'.

Figure 4:
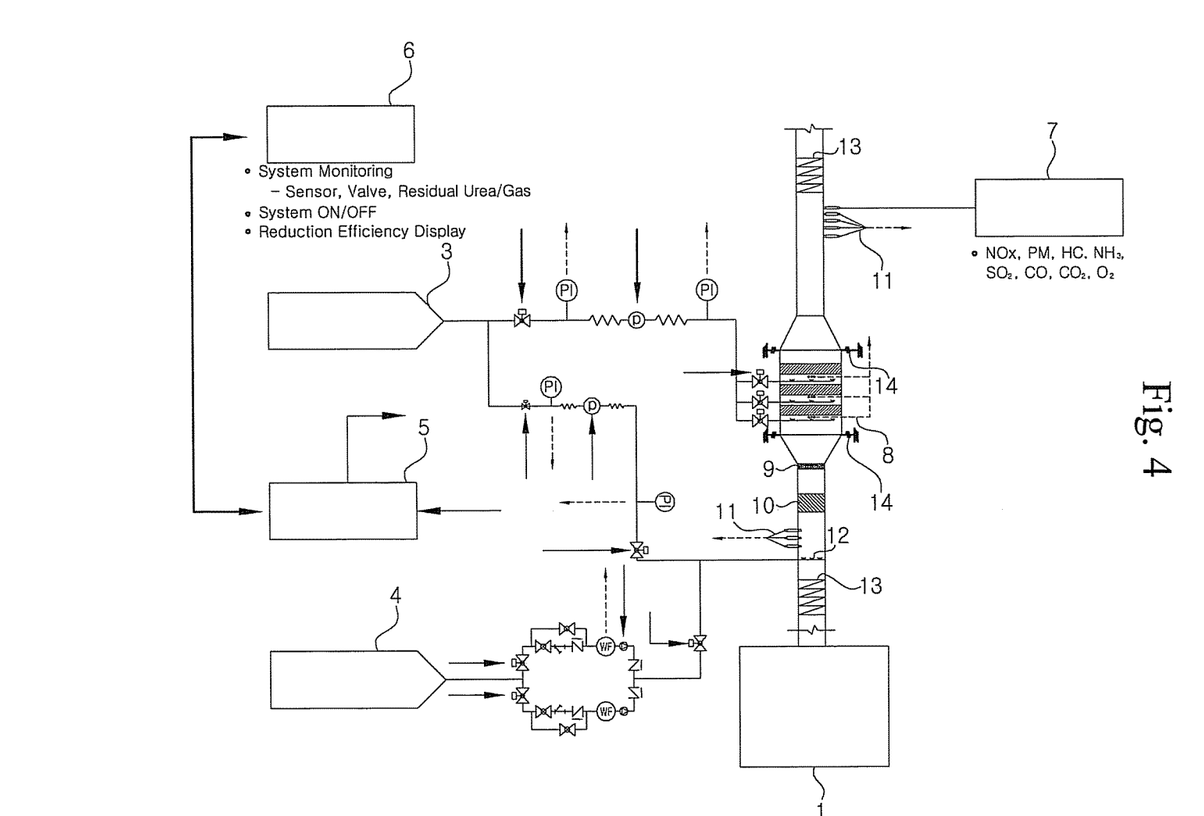
FIG. 4 is a view of a modification of the third embodiment shown in FIG. 3.

However, it should be understood that the anti-vibration device 14 may be applied to a system including the two-way air line. FIG. 4 shows an SCR system including an anti-vibration device 14 and a two-way air line 3.

Other components of this embodiment are similar to those of the first and second embodiments and a description thereof will be omitted herein.

Fourth Embodiment: Bypass System

Figure 5:
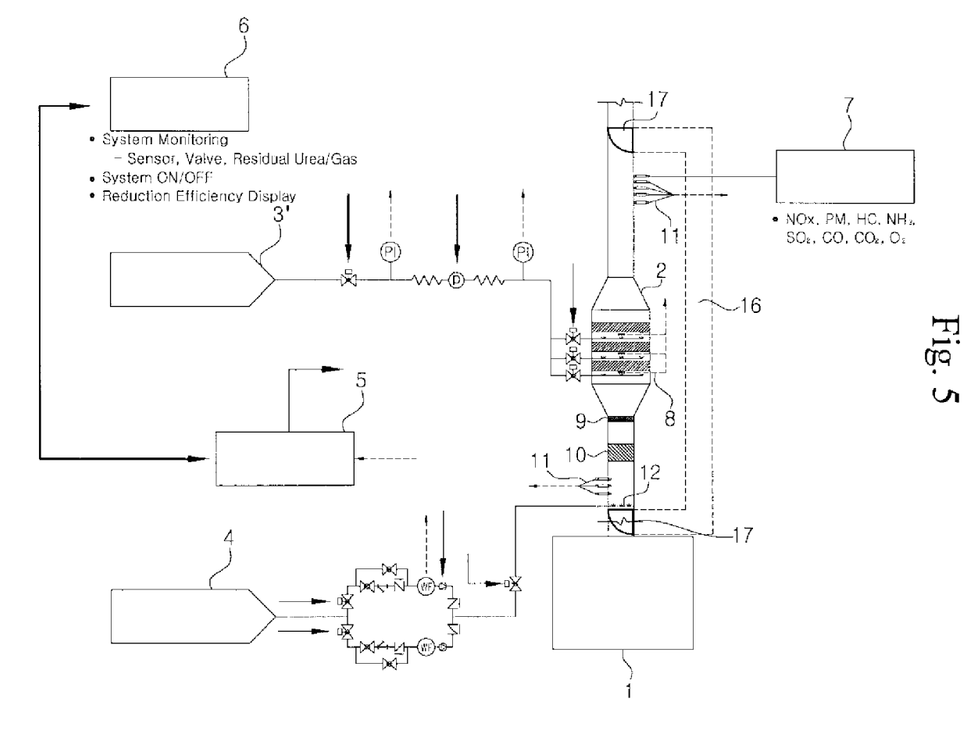
FIG. 5 is a view of an SCR system for vessels in accordance with a fourth embodiment of the present disclosure.

FIG. 5 is a view of an SCR system for vessels in accordance with a fourth embodiment.

Referring to FIG. 5, the SCR system of this embodiment includes a bypass system, which allows a broken or inoperative part or component, particularly, a broken component of an SCR reactor 2, to be repaired or replaced without stopping operation of the exhaust gas source 1 upon an abnormal or emergency state of the SRC system.

In this embodiment, the bypass system includes a bypass line 16 and bypass dampers 17. The bypass line 16 is connected at both ends thereof to leading and rear ends of the SCR reactor 2, respectively. A gas flows through the SCR reactor 2 in a normal state, but bypasses the SCR reactor 2 to flow through the bypass line 16 from the leading end to the rear end of the SCR reactor 2 in an abnormal or emergency state. A pair of bypass dampers 17 is provided to opposite ends of the bypass line 16, respectively. The pair of bypass dampers 17 closes the opposite ends of the bypass line 16 while opening a path in the SCR reactor 2 in the normal state, but opens the opposite ends of the bypass line 16 while closing the path of the SCR reactor 2 in the abnormal or emergency state.

Figure 6:
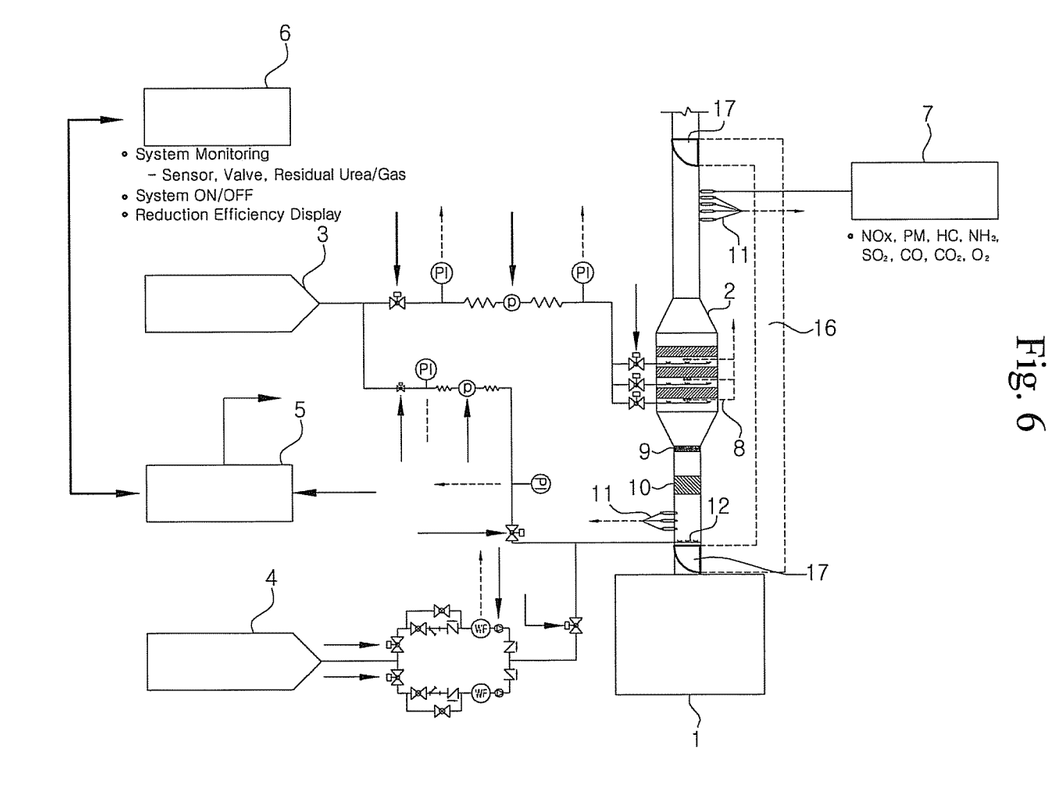
FIG. 6 is a view of a modification of the fourth embodiment shown in FIG. 4.

The SCR system shown in FIG. 5 is an SCR system for vessels, which includes a one-way air line 3'. However, it should be understood that the bypass line and bypass dampers may also be applied to an SCR system including the two-way air line. FIG. 6 shows an SCR system including a bypass line 16, bypass dampers 17, and a two-way air line 3.

Other components of this embodiment are similar to those of the above embodiments and a description thereof will be omitted herein.

Herein, the SCR systems according to the embodiments have been illustrated as being applied to vessels. Obviously, however, the SCR systems according to the embodiments may also be applied to land-based plants that include installations for discharging exhaust gas.

As such, according to one embodiment, the bypass system of the SCR system allows exhaust gas to bypass the SCR reactor, so that a broken or inoperative part or component can be repaired or replaced without stopping operation of an exhaust gas source upon an abnormal or emergency stage of the SCR system.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An SCR system of a vessel for discharging exhaust gas from an exhaust gas source in the vessel to an outside after performing purification of the exhaust gas, the SCR system comprising:

an SCR reactor connected at a leading end thereof to the exhaust gas source and comprising a catalyst capable of activation by the introduction of exhaust gas into the SCR reactor;

a reducing agent supply line configured to supply $NH_3$ or urea into the SCR reactor;

a two-way air line having a first branch operably connected to the reducing agent supply line and a second branch operably connected to the SCR reactor at a middle portion thereof to supply air to an air soot blower disposed inside of the SCR reactor, the air soot blower configured to blow air supplied from the second branch of the two-way air line toward the catalyst to remove foreign matter from the catalyst;

a mixer positioned at the leading end of the SCR reactor to mix the exhaust gas with the $NH_3$ or urea; and a bypass system for forcing the exhaust gas discharged from the exhaust gas source to bypass the SCR reactor, the bypass system comprising a bypass line connected at both ends thereof to the leading and rear ends of the SCR reactor; and a pair of bypass dampers respectively provided to both ends of the bypass line, the pair of bypass dampers configured to close the opposite ends of the bypass line while opening a path in the SCR reactor in a normal state, but open the opposite ends of the bypass line while closing the path of the SCR reactor in an abnormal or emergency state, the path located in the SCR reactor and between the opposite ends of the bypass line.

2. The SCR system of claim 1, wherein the SCR reactor is provided at the leading end thereof with a damper positioned downstream of the mixer for uniformly distributing the exhaust gas in the catalyst.

3. An SCR system of a vessel for discharging exhaust gas source in the vessel to an outside after performing purification of the exhaust gas, the SCR system comprising:

an SCR reactor connected at a leading end thereof to the exhaust gas source and comprising a plurality of layers of catalyst capable of activation by the introduction of exhaust gas into the SCR reactor, the SCR reactor further comprising an air soot blower adjacent each layer of catalyst;

a two-way air line having a first branch and a second branch;

a reducing agent supply line for supplying $NH_3$ or urea into the SCR reactor; and a bypass system for forcing the exhaust gas discharged from the exhaust gas source to bypass the SCR reactor, the bypass system comprising a bypass line connected at both ends thereof to the leading and rear ends of the SCR reactor; and a pair of bypass dampers respectively provided to both ends of the bypass line capable of closing the bypass line in a normal state while capable of opening the bypass line in an abnormal or emergency state, the first branch of the two-way air line operably connected to the reducing agent supply line;

the second branch of the two-way air line further branched and operably connected to the air soot blower;

the air soot blower configured to blow air via the further branched second branch of the two-way air line to each layer of catalyst thereby removing foreign matter from each layer of catalyst; and the pair of bypass dampers configured to close the opposite ends of the bypass line while opening a path in the SCR reactor in the normal state, but configured to open the opposite ends of the bypass line while closing the path of the SCR reactor in the abnormal or emergency state, the path located in the SCR reactor and between the opposite ends of the bypass line.

\* \* \* \* \*